United States Patent
Dahlin et al.

(10) Patent No.: US 8,635,727 B2
(45) Date of Patent: Jan. 28, 2014

(54) VARIABLE-SIZE BED

(75) Inventors: Johan Dahlin, Grästorp (SE); Claes Lindh, Lidköping (SE); Olov Karlsson, Södertälje (SE); Håkan Karlsson, Södertälje (SE)

(73) Assignee: Stjernfjadrar AB, Herrljunga (SE)

( * ) Notice: Subject to any disclaimer, the term of this patent is extended or adjusted under 35 U.S.C. 154(b) by 228 days.

(21) Appl. No.: 12/734,324

(22) PCT Filed: Oct. 23, 2008

(86) PCT No.: PCT/SE2008/051202
§ 371 (c)(1),
(2), (4) Date: Aug. 27, 2010

(87) PCT Pub. No.: WO2009/054798
PCT Pub. Date: Apr. 30, 2009

(65) Prior Publication Data
US 2010/0325810 A1 Dec. 30, 2010

(30) Foreign Application Priority Data
Oct. 23, 2007 (SE) ...................................... 0702364

(51) Int. Cl.
*A47C 23/04* (2006.01)

(52) U.S. Cl.
USPC ............... 5/716; 5/12.1; 5/18.1; 5/181; 5/251

(58) Field of Classification Search
USPC ............. 5/181, 185, 249–251, 720, 722, 118, 5/12.1, 18.1, 53.1, 295, 655.8, 183, 184, 5/202, 240
See application file for complete search history.

(56) References Cited

U.S. PATENT DOCUMENTS

| | | | | |
|---|---|---|---|---|
| RE5,275 E | * | 2/1873 | Caro | 5/183 |
| RE9,099 E | * | 2/1880 | Streit | 5/18.1 |
| 293,486 A | * | 2/1884 | Maynard | 5/251 |
| 296,953 A | * | 4/1884 | Ham | 5/251 |
| 318,381 A | * | 5/1885 | Lovell | 5/251 |
| 378,397 A | * | 2/1888 | Homan | 5/251 |

(Continued)

FOREIGN PATENT DOCUMENTS

| | | |
|---|---|---|
| EP | 1207074 | 5/2002 |
| GB | 1538525 | 1/1979 |
| SE | 518584 | 10/2002 |
| WO | WO 02/44077 | 6/2002 |

*Primary Examiner* — Robert G Santos
*Assistant Examiner* — Richard G Davis
(74) *Attorney, Agent, or Firm* — Harness, Dickey & Pierce P.L.C.

(57) ABSTRACT

The present invention relates to a variable-size bed (10) comprising a mattress core (16) and a base (14), which base is adapted to support at least a portion of the mattress core, wherein the mattress core and base have adjustable widths or lengths and each of the mattress core and base is changeable between an expanded state and a contracted state corresponding to an expanded state and a contracted state of the bed, respectively, and wherein the bed further comprises a cover means adapted to provide covering over the mattress core in both the expanded state and the contracted state of the bed. The present invention also relates to a vehicle comprising such a variable-size bed.

23 Claims, 7 Drawing Sheets

(56) References Cited

U.S. PATENT DOCUMENTS

| | | | |
|---|---|---|---|
| 379,138 A * | 3/1888 | Stuart | 5/251 |
| 1,721,647 A * | 7/1929 | Stoltenberg | 5/18.1 |
| 3,450,072 A * | 6/1969 | Farkas | 108/102 |
| 4,099,275 A * | 7/1978 | Pallan | 5/18.1 |
| 4,664,438 A * | 5/1987 | Crepaldi | 296/190.02 |
| 6,609,753 B2 | 8/2003 | Schmidt-Schaeffer | |
| 7,048,263 B2 * | 5/2006 | Ahlqvist | 267/91 |
| 2002/0060484 A1 | 5/2002 | Schmidt-Schaeffer | |
| 2006/0010608 A1* | 1/2006 | DeFranks et al. | 5/738 |

* cited by examiner

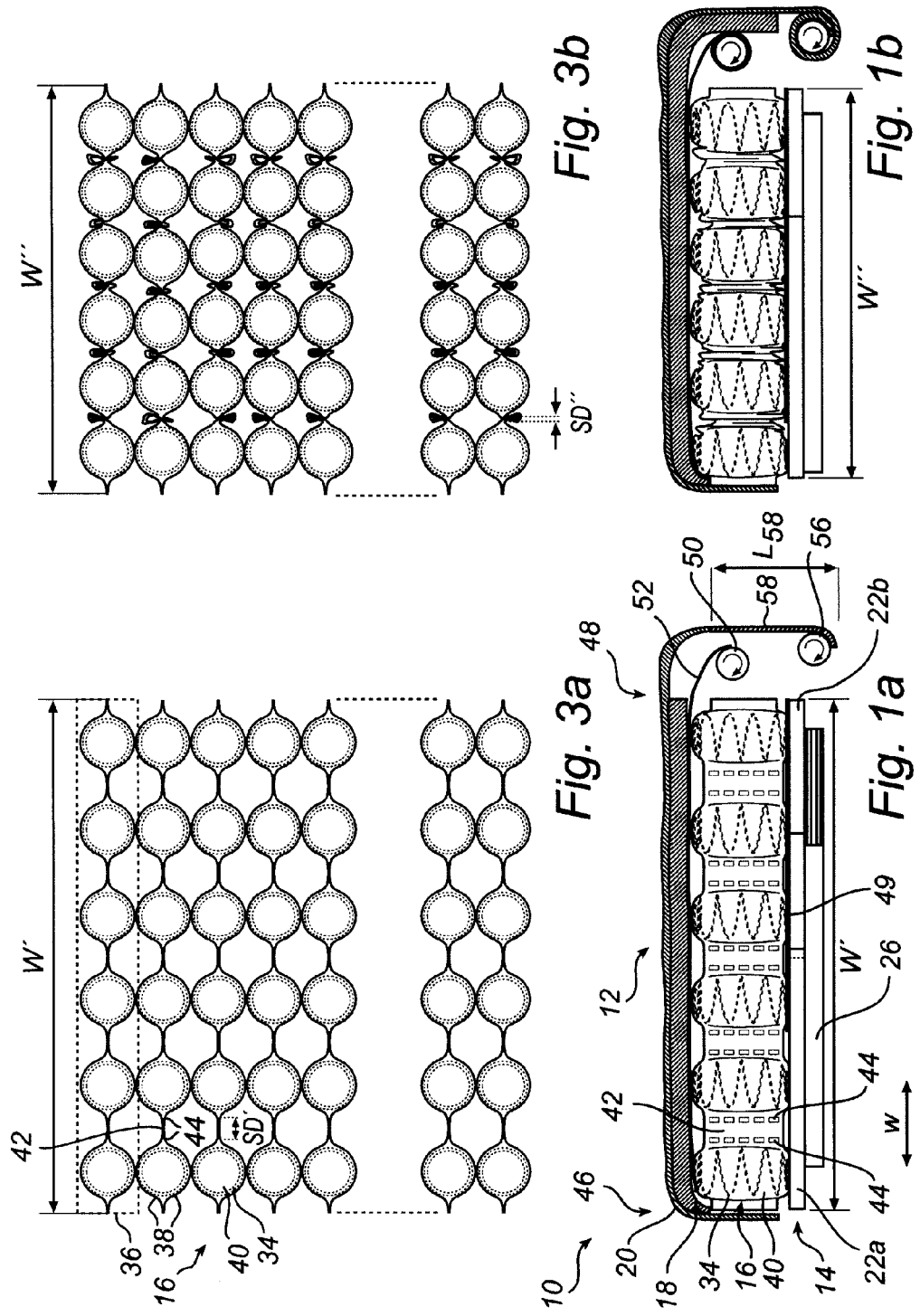

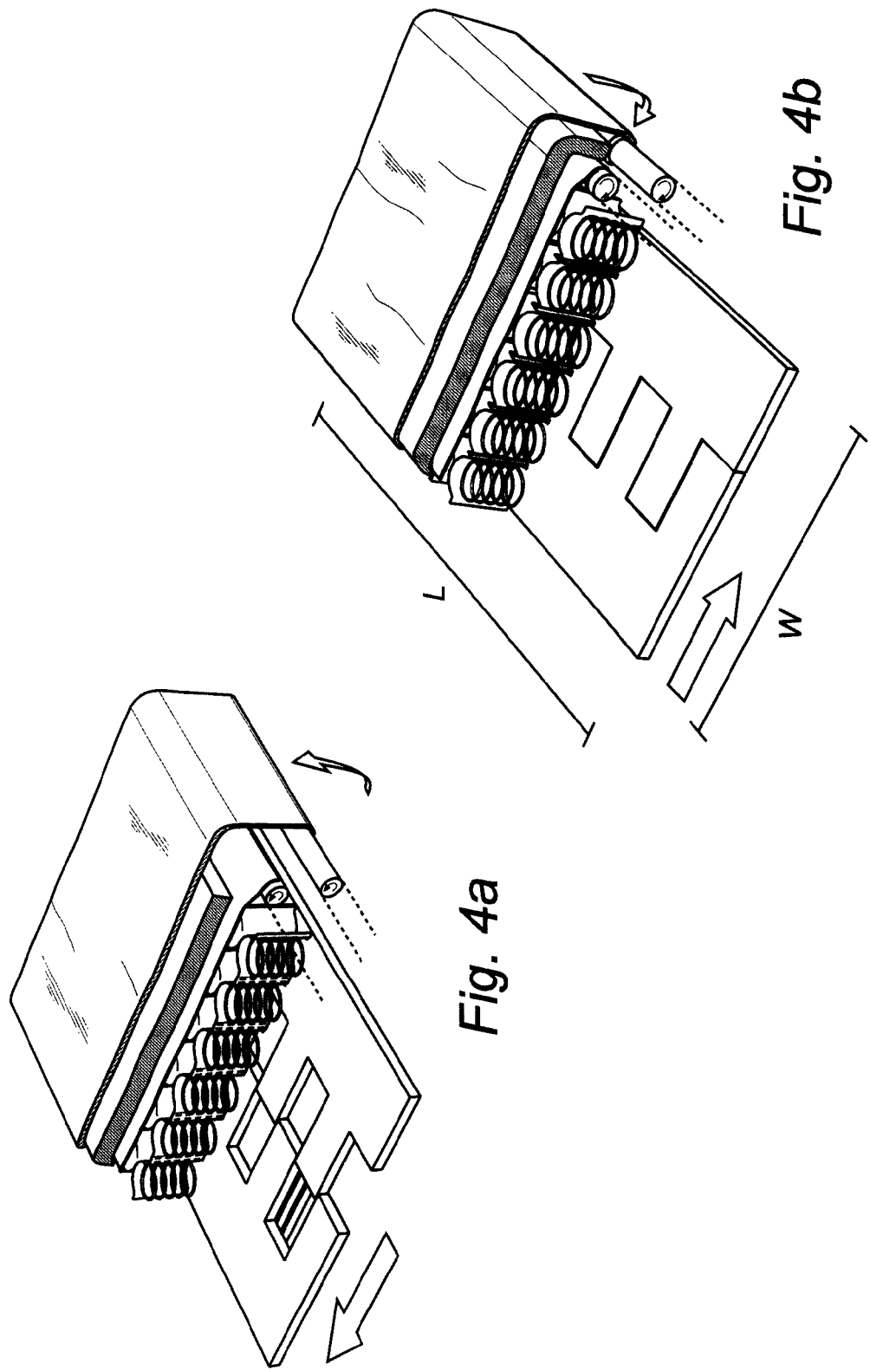

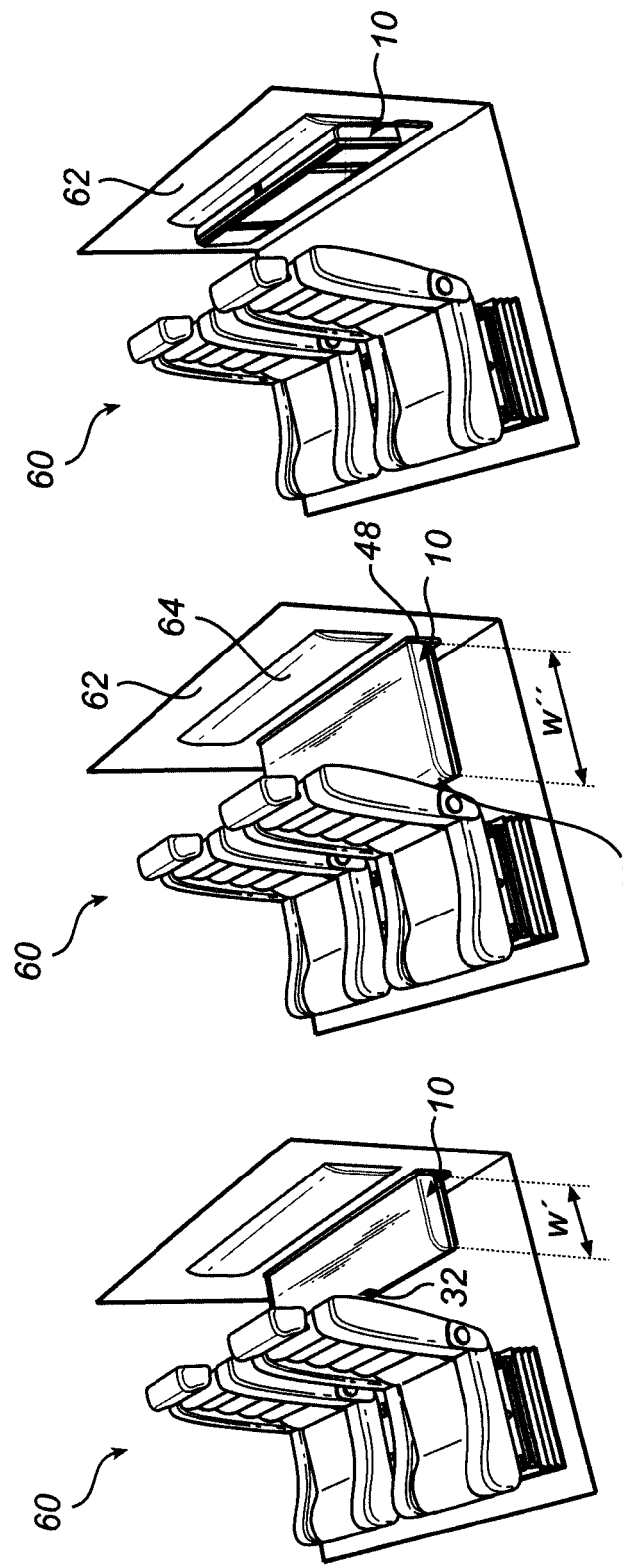

VARIABLE-SIZE BED

FIELD OF THE INVENTION

The present invention relates to a variable-size bed, as well as a vehicle comprising such a variable-size bed.

BACKGROUND OF THE INVENTION

A variable-size bed which can function as both a sleeping arrangement (larger bed size) and a seating arrangement (smaller bed size) is particularly advantageous in applications such as truck or lorry cabs where the space may be too limited to have both a dedicated sleeping arrangement and a dedicated seating arrangement.

For instance, the patent document GB 1 538 525 discloses a lorry cab in which a back seat comprises a seat cushion and a backrest. The seat cushion can be selectively moved into a forward couch position and a rearward seat position. In the seat position, the cushion is adjacent to a rear wall of the cab, providing leg space between the cushion and the back of a driver's seat in front of the back seat for comfortable seating. In the couch position, the cushion is at a greater distance from the cab's rear wall, which distance is bridged over by a tensioned support made in one piece with a top covering of the cushion. The support may be rolled up.

However, a problem with the solution in GB1 538 525 is that the seat cushion itself provides the same comfort both in the couch and seat positions, whereas it usually is more preferable to have softer comfort in a sleeping arrangement and harder comfort in a seating arrangement. Further, in the couch position, the complete bed area or bed face where a person should lie and sleep is only partly supported by the underlying seat cushion (while the remaining area is "supported" by the tensioned support). Therefore, the support for the person lying on the bed area may be uneven, which could make the arrangement uncomfortable to rest on.

SUMMARY OF THE INVENTION

It is therefore an object of the present invention to at least partly overcome these problems, and to provide an improved variable-size bed which is comfortable and features robust operation.

These, and other objects that will be apparent from the following, are achieved by a variable-size bed, and a vehicle comprising such a variable-size bed, according to the appended claims 1 and 15, respectively.

According to one aspect of the present invention, there is provided a variable-size bed comprising a mattress core and a base, which base is adapted to support at least a portion of the mattress core, wherein the mattress core and base have adjustable widths or lengths and each of the mattress core and base is changeable between an expanded state and a contracted state corresponding to an expanded state and a contracted state of the bed, respectively, and wherein the bed further comprises a cover means adapted to provide covering over the mattress core in both the expanded state and the contracted state of the bed.

Even though denoted 'bed', the present variable-size bed can advantageously be used as a couch or seat allowing a person to sit thereon when it is in the contracted state, in which the bed is narrower or shorter than in the expanded state. Further, the mattress core and base are preferably basically rectangular, hence each having a width and a length, one of which being adjustable. Further, the base is preferably attached to the mattress core, for instance at the long sides of the bed in case of width adjustment, such that by changing the dimension of the base, the mattress core follows along.

Further, the mattress core and base have adjustable width or length meaning that their extensions (in the width or length direction) may be altered without adding any extra mattress core or base parts or the like. For instance, the present mattress core being extensible or expandable may be constituted by a single main part which may be "drawn out" and "compressed" width- or lengthwise, respectively, while the base may comprise several cooperative main parts for changing the overall size of the base. In particular, it is preferred that the mattress core is expanded symmetrically, thus providing a homogeneous distribution of the extension between the parts, such as springs, forming the mattress core. Hereby, the density of e.g. springs both in a length and width direction in the mattress core is essentially uniform at all positions over the mattress core both in the contracted and the expanded state.

Further, the cover means preferably provides covering of at least the entire top side of the mattress core, which 'covering' could be a suitable amount or extension of a cover fabric or textile matching the current size of the underlying mattress core.

The present variable-size bed using a mattress core having adjustable width or length provides for a comfortable seating or lying experience both in the contracted (narrower or shorter) state and the expanded (wider or longer) state of the bed, as the mattress core size is adjusted along with the bed size with respect to the sitting or lying area of the bed. Also, the likewise adjustable base may offer full support for the rest of the bed both in the contracted and expanded states. The contracted and expanded states do not have to be extreme states. Also, intermediate states are envisaged.

The cover means preferably comprises a cover attached to a retracting element, which retracting element is arranged to release the cover during a change into the expanded state of the bed and to retract the cover during a change into the contracted state of the bed. Several alternative realizations of such retracting elements are discussed in the following, such as elastic retracting elements, roll-up devices or non-elastic elements.

In one embodiment, the retracting element is a non-elastic element connecting an edge of the cover to the base of the bed, said non-elastic element being arranged to maintain the cover in a tense, or at least relatively tense, state. For example, the non-elastic element may be in the form of a connection line, such as a strap, wire, cord, belt or the like. The connection line is preferably arranged to transfer a displacement of one or several base parts of the bed to a retracting/releasing force working on the cover. For example, when a base comprising two displaceable part is used, the non-elastic element is preferably connected to the base part being farthest away from the connection to the cover, but drawn in a loop via a holding element, such as a tackle, roll or ring, connected to the base part being closest to the connection to the cover. Hereby, the cover will automatically be released or retracted in proportion to the displacement between the base parts.

In another embodiment, the cover means comprises a cover attached to an automatic roll-up device, which automatic roll-up device is adapted to roll out cover in the expanded state and roll in cover in the contracted state. Using such an automatic roll-up device provides for smooth management of a cover which in itself does not have to be stretchable. The cover preferably covers at least the entire top side of the mattress core (and hence the bed), and it may on one hand be attached to the mattress core and/or the base at a long side of the bed (width adjustment), and on the other hand be attached to the automatic roll-up device arranged at the opposite long side of the bed. The automatic roll-up device is preferably a retracting roll biased so as to automatically retract and roll up any untensioned cover, for instance in case the mattress core and base are changed to a narrower/shorter (contracted) state, while at the same time allowing cover to be rolled off therefrom in case a force opposite to and larger than the roll's bias force is applied to the cover, for instance in case the mattress core and base are changed to a wider/longer (expanded) state, so that an un-rolled portion of the cover always matches the size underlying mattress core (leaving no leftover cover or exposed mattress core top). The bias force of the roll-up device may be a spring force provided by at least one spring. Further, the automatic roll-up device may form part of the bed itself, or be externally arranged in association with the bed. Further, a portion of the cover next to the automatic roll-up device may be thinner than a main cover portion. For instance, the extension of the cover closest to the roll-up device may be made of a material which has reduced thickness compared to the rest of the cover. A thinner material is easier to roll on and off a roll of the automatic roll-up device, and the automatic roll-up device with a thinner material rolled up on it takes up less space, compared to a case where the cover is composed of a (thicker) material having even or uniform thickness only, which nevertheless is an envisaged embodiment. The portion having the smaller thickness may be made of non-woven material, while the main cover portion for instance may be made of textile or quilted fabric.

Instead of being attached to the automatic roll-up device, the cover may be attached to an elastic retracting element, for instance a piece of elastic or stretchable material or at least one spring or the like capable of being stretched or expanded and then resuming former shape, to allow the cover layer to follow along with the expansion/contraction of the bed.

As another alternative, the entire cover may be stretchable, in order to match the various sizes of the underlying mattress core. In this case, the cover means is mainly constituted by the stretchable cover itself, and no automatic roll-up device or elastic retracting element is required.

In one embodiment, the bed further comprises a separate padding layer arranged between the cover (means) and the mattress core. Such a padding layer, preferably made of polyether or other foam plastic, alternatively of felt or latex or the like, generally increases the comfort of a bed or seat. The present padding layer is preferably attached to the cover, and may hence be moved along with the adjustment of the cover.

Preferably, a piece of material is arranged between the padding layer and the mattress core and further attached to a second automatic roll-up device. This piece of material can for instance be made of a thin non-woven material, and it has turned out to beneficially facilitate the retraction of the cover and padding layer so that smaller springs can be used in the cover and padding layer roll-up device.

In one embodiment, the cover and padding layer are attached to a front edge of the remaining bed, the second automatic roll-up device is arranged at a back edge of the bed opposite said front edge, and the automatic roll-up device for the cover is arranged at the back edge of the bed such that the cover also covers the second automatic roll-up device. The front and back edges refer here to the long sides of the bed in case of width adjustment of the bed, and the short sides in case of length adjustment. The present embodiment allows robust and effective management of the cover and padding layer, yet providing a compact structure where the two roll-up devices may be arranged on top of each other at one edge of the bed. Alternatively, one of the automatic roll-up devices could be arranged at one side of the bed, and the other at the opposite side of the bed.

In one embodiment, the base comprises two parts displaceable in relation to each other in a width or length direction, corresponding to the adjustable width or length of the base. Preferably, the parts are two opposite interleavable comb-shaped parts. Each comb-shaped part may have a plurality of tongues spaced apart along its length or width, and the tongues of one part may be interleaved between the tongues of the other part. When the bed's size is varied, the parts are relatively moved laterally in one of the width and length direction further away from each other in the expanded state or closer together in the contracted state of the base. In the contracted state, the parts may be completely interleaved forming a basically complete base surface for supporting the overlying mattress core, and in the expanded state, the parts may be separated and only partly interleaved, but still provide a decent and sufficient support for the mattress core. In this way, beneficially, no additional base parts have to be added or removed or folded out or the like when the bed's size is changed. Instead of the above interleavable comb-shaped parts, a base comprising one part selectively and gradually insertable into or under/over another opposite part for changing the overall dimension of the base could be used, for instance, whereby the overlap between the parts is adjustable. Also, a slide plate or layer is preferably arranged between the mattress core and the base, so that the mattress core does not get stuck between the base parts during expansion/contraction of the bed.

Preferably, the bed further comprises a guide structure to which said parts of the base are mounted. The guide structure may provide additional stability to the base and ensure that the parts are not completely separated or vertically misaligned. An exemplary guide structure comprises at least one pair of slidably engaged rails, one rail attached to one base part and the other rail attached to the other base part, wherein the rails may be displaced in relation to each other in the width or length direction of the bed.

Also preferably, the bed further comprises a lock mechanism for interlocking said parts in at least the expanded state and the contracted state, for convenient handling of the bed. Intermediate locking states are also possible. An exemplary lock mechanism comprises a user actuated transversal pin engaging in holes or the like in one or more of the rails for selectively interlocking the rails (and hence the parts of the base) in the width- or length direction of the bed.

In one embodiment, the mattress core is a pocket-spring mattress core comprising a plurality of interconnected coil springs enclosed in spring covers, in which pocket-spring mattress core at least two springs that are located adjacent to one another are spaced apart by an interjacent separation distance when the mattress core is in the expanded state and placed closer together when the mattress core is in the contracted state. Such a mattress core is particularly advantageous in that it provides harder comfort in the contracted state when the springs are placed nearer each other and a person is due to sit on the bed, and softer comfort in the expanded state when the springs are placer farther away from each other and person is due to lie on the bed. An exemplary mattress core suitable for use in the present invention is disclosed in more detail in the patent document WO 02/44077 by the same applicant, the contents of which document hereby is incorporated by reference. Instead of the above mattress core, other spring units could be used, for instance a spring pocket-mattress core wherein at least some spring covers comprise a plurality of stretch openings into the interior of the spring cover, and at least some of the stretch openings are displaced in relation to each other in a lengthwise direction of the spring. Alternatively, a somewhat flexible foam mattress core could be used.

Preferably, a change from the contracted state to the expanded state of the bed corresponds to an increase of the one of the bed's width and length of about 15-50%, preferably about 20-40%. A change from the expanded to the contracted state corresponds to an equivalent decrease of the bed's width or length. For instance, the bed's width may be variable between about 60 cm and about 80 cm.

It is also preferred that the mattress core and the base are only attached at two opposite sides of the bed, said sides being transverse to the adjustable widths or lengths direction. Thus, in a case where the width of the bed is adjustable, the points of attachment between the mattress core and the base are arranged close to the long side edges of the bed, and in a case where the length of the bed is adjustable, the points of attachment are arranged close to the short side edges of the bed. By means of this arrangement, the base and mattress core may expand/contract independently between the sides where the points of attachment are arranged.

According to another aspect of the present invention, there is provided a vehicle comprising a size-adjustable bed according to the above description. The vehicle may for instance be a motor vehicle like a truck or a lorry, but the present size-adjustable bed may be used anywhere it is desirable and useful to save space and/or be able to switch between sitting and lying arrangements, like in a boat, camper, caravan, trailer, in a small room, etc. In an exemplary arrangement, when the width of the bed is changeable, one long side of the bed is preferably mounted to a wall portion or the like, for instance in a cab of the truck. The bed may in this case function as a back seat in the contracted seat, and as a bunk or bed when in the expanded state. A user may make the bed wider by pulling for instance a handle arranged at the opposite long side of the bed away from the wall, or make the bed narrower by pushing it towards the wall, while operating any lock mechanism. Means for motorized adjustment of the bed's width are envisaged as an option. All of the mattress core, base, cover, and optional padding layer automatically follow along as the size of the bed is changed. Further, the bed may be hingedly mounted to the wall portion, allowing the bed to be folded away when not in use, to further save space.

BRIEF DESCRIPTION OF THE DRAWINGS

These and other aspects of the present invention will now be described in more detail, with reference to the appended drawings showing a currently preferred embodiment of the invention.

FIGS. 1a-1b are schematic cross-sectional side views of a variable-size bed in an expanded state and a contracted state, respectively, according to an embodiment of the present invention.

FIGS. 3a-3b are schematic top views of a mattress core of the variable-size bed of FIGS. 1a-1b in the expanded and contracted state, respectively.

FIGS. 4a-4b are schematic partially sectional perspective views of the variable-size bed of FIGS. 1a-1b in the expanded and contracted state, respectively.

FIGS. 7a-7c are schematic perspective views of a truck cab comprising a variable-size bed in a contracted state, an expanded state, and a fold-up state, respectively, according to an embodiment of the invention.

DETAILED DESCRIPTION

Figure 2A:
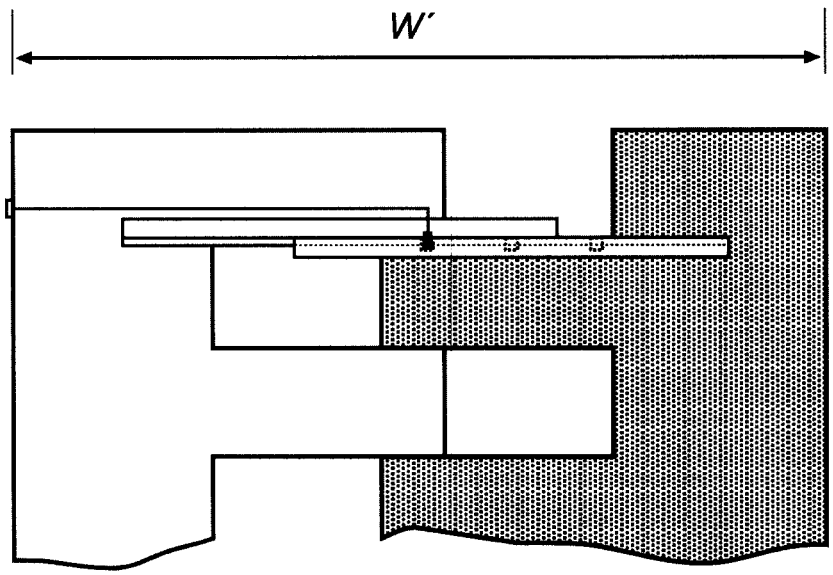
FIGS. 2a-2b are schematic partial bottom views of a base of the variable-size bed of FIGS. 1a-1b in the expanded and contracted state, respectively.

With reference to FIGS. 1 and 4, a variable-size bed 10 according to a currently preferred embodiment of the present invention will now be described.

The bed 10 in FIGS. 1 and 4 as seen from a top view is basically rectangular with a width W and an length L. The width W of the bed 10 is adjustable, meaning that a top area 12 of the bed 10 for accommodating one or more sitting or lying persons can be varied in size in one dimension w, so that the bed can become wider (expanded or extended or drawn out state) or narrower (contracted or non-expanded state).

The main constituents of the bed 10 include, from bottom to top in FIGS. 1a-1b, a base 14, a mattress core 16, a padding layer 18, and a cover 20. The base 14 basically functions to support at least the underside of the mattress core 16, and the cover 20 basically serves to cover at least the upper side of the mattress core 16, preferably also the front side of the mattress core, as illustrated. The padding layer 18 is provided in between the mattress core 16 and the cover 20 in order to increase the comfort of the bed 10. By way of definition, the present mattress core 16 and padding layer 18 and cover 20 forms part of a complete mattress.

Figure 2B:
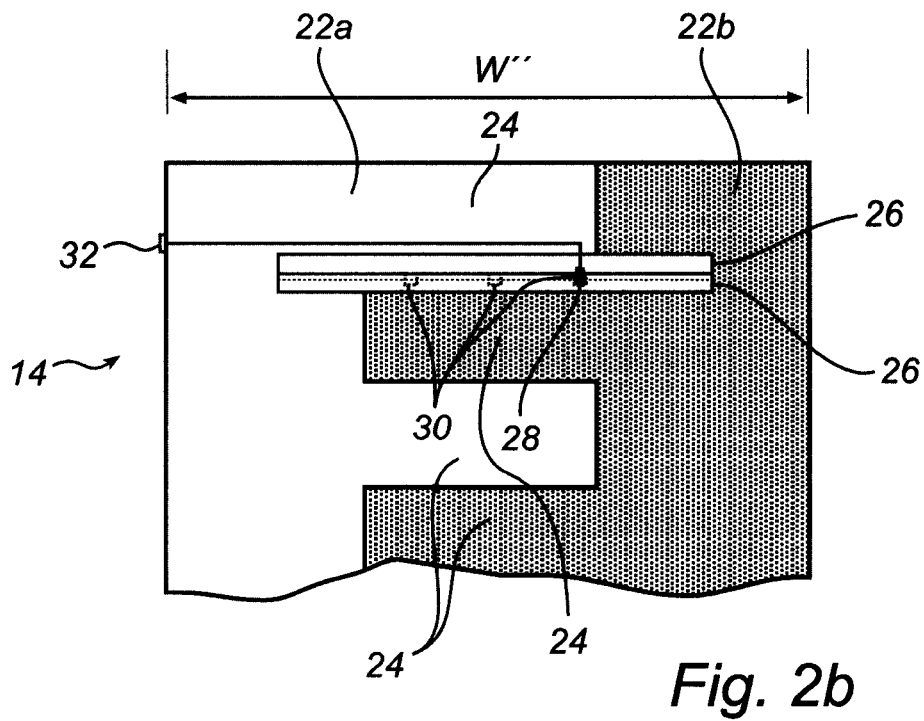

The exemplary base 14, as also illustrated in FIGS. 2a-2b, comprises two oppositely arranged, interleavable comb-shaped parts 22a, 22b. Each comb-shaped part 22a, 22b has a plurality of tongues 24 spaced apart along its length, and the tongues of one part may be interleaved between the tongues of the other part. The parts 22a, 22b may for instance be made of plywood, composite material, sheet, or some other rigid material.

The parts 22a, 22b are arranged on a guide structure comprising at least one pair of slidably engaged rails 26. In a preferred setup, one pair of rails is arranged near one short side of the base, and another pair is arranged near the opposite short side of the base. The rails 26 of each pair are displaceable in relation to each other in the width direction w, and one rail 26 of each pair is attached to one of the parts 22, and the other rail 26 of each pair is attached to the other one of the parts 22. The rails 26 are arranged so as to allow the two parts 22a, 22b to move in a lateral fashion in the width direction w between a completely interleaved state (contracted state, FIG. 2b) and a partly interleaved state (expanded state, FIG. 2a).

In order to lock the base 14 in the two mentioned states, and in optional intermediate states, a pin 28 is arranged in at least one of the rails 26. The pin 28 is moveable transversal to the slide direction of the rails 26, so as to selectively engage in one of several facing holes 30 or the like arranged in the lengthwise direction of rail 26 in the same pair as the rail having the pin 28, the several holes 30 corresponding to several states or widths of the base 14, in order to interlock the rails 26 of a pair (and thus the parts 22) in said states or positions, as illustrated in FIGS. 2a-2b. In FIG. 2a (and FIG. 1a), the base 14 is locked in an expanded state having a width W', while in FIG. 2b (and FIG. 1b), the base 14 is locked in a contracted state having a width W" (<W'). When changing between states, the pin 28 is retracted so that the rails 26 can move freely along each other. Preferably, the pin 28 is linked (mechanically or electrically) to a user actuated switch 32 conveniently arranged in a central position at the front edge of the base 14, allowing a user to control the pin 28, and hence step-wise adjust and lock the width W of the base 14.

The exemplary mattress core 16, as also illustrated in FIGS. 3a-3b, is a so called pocket-spring mattress core, comprising a plurality of interconnected coil springs 34. The springs 34 are arranged in several strips 36 each comprising two layer portions 38 arranged so as to form spring covers 40 for enclosing the springs 34. The two layer portions 38 may be formed by two separate layers, or by one single layer which is folded to form the two layer portions. The strips 36 are arranged so as to extend in the width direction of the mattress core 16 (and hence of the bed 10), and several strips are joined together side by side to form the mattress core 16. Between essentially all springs 34 in the width direction w of the mattress core 16, that is, between essentially each two springs 34 that are located adjacent to one another in essentially each strip 36, there is provided a separation portion 42. A separation portion 42 may for instance be achieved by arranging two joining-together lines 44 that are spaced apart in the lengthwise direction of the strip 36, so as to join-together the two layer portions 38 on each side of the springs 34. The layer portions 38 forming the spring covers 40 and separation portions 42 may for instance be made of weldable textile fabric, and the joining-together lines 44 may as illustrated be spot welded seams.

The present mattress core structure allows adjustment of the width W of the mattress core 16. For instance, in an expanded state wherein the mattress core's width is W', the mattress core 16 is drawn out (for instance by hand power) in the width direction w, whereby the separation portions 42 are stretched out, resulting in separation distances SD', and the springs 34 in each strip 36 are spaced apart (see for instance FIGS. 1a and 3a). On the other hand, in a contracted or non-expanded state wherein the mattress core is narrower (width W"), the mattress core 16 is compressed or pushed (for instance by hand power) in the width direction w, whereby the separation portions 42 are folded or squeezed together, resulting in separation distances SD", and the springs 34 in each strip 36 are placed almost next to each other (see for instance FIGS. 1b and 3b). The springs 34 could even be so much pushed together that the separation distance becomes "negative". Thus, the separation portions 42 are utilized as a clearance or free space for allowing adjustment of the extension of the mattress core 16 in the width dimension. Intermediate states between an expanded state with maximum stretch of the separation portions 42, and a contracted state wherein the springs 34 are placed substantially immediately next to each other (SD"≈0), are also possible. When the springs 34 are situated further away from each other, in an expanded state, the mattress core's comfort is softened, due to the less dense distribution of the springs 34 over the mattress core area. On the other hand, when the springs 34 are placed closer together, in a contracted or less expanded state, the mattress core's comfort is hardened, due to the more dense distribution of the springs 34.

In an exemplary bed 10, the length of the mattress core is about 200 cm with 33 springs in the length direction, and the width may vary between about 60 cm and 80 cm (W"-W'). To this end, the mattress core may comprise eight springs in each parallel stripe, and the maximum separation distance should be about 2 cm.

In the above-discussed embodiment of a mattress core, the strings are arranged in parallel to the extension direction of the bed. Thus, in a bed which is extendible in the width direction, the strings are also arranged in the width direction, and in a bed extendible in the length direction, the strings would consequently be arranged in the length direction. However, it is also possible to use other types of spring mattress cores, and e.g. where the strings are arranged perpendicular to the extension direction. In such embodiments, the extendability of the mattress core is accomplished by means of a variable separation distance between adjacent springs arranged in different strings, i.e. an variable separation distance between the strings, instead of between springs within the same string. A mattress core of the latter type may e.g. have spring covers that comprise a plurality of relatively small stretch openings into the interior of the spring cover, and displaced in relation to each other in a lengthwise direction of the spring, thereby forming a net-like structure of the spring cover.

It is also feasible to combine the above-discussed different types of pocket mattresses, thereby enabling extendability in two different directions, i.e. both in the width direction and in the length direction.

Alternatively, a somewhat flexible foam mattress core could be used.

In the present bed 10, the base 14 and mattress core 16 preferably have basically the same dimensions, that is, equal length and width W'-W", which also essentially become the overall dimensions L and W of the bed 10.

Also preferably, they are joined together only at the long sides of the bed 10, namely at a front edge 46 as well as at a back edge 48 of the bed 10. This means that if one of the base 14 and mattress core 16 is actuated so as to change its dimension w, the other one comes along automatically. At the same time, the base 14 and mattress core 16 may expand/contract independently between the attachment points at 46 and 48 since there is no attachment restricting sideways movements therebetween (only vertical support), allowing smooth adjustment of the width of the bed. Also, a thin (about 1.5 mm) but solid slide plate or layer 49 is preferably arranged between the mattress core 16 and the base 14, preventing the mattress core 16 from getting get stuck between the base parts 22a, 22b during expansion/contraction of the bed 10. One end of the slide plate 49 may for instance be attached at 48, while the rest of it is lying free between the mattress core 16 and base 14.

As well as providing vertical support, the base 14 may additionally provide horizontal support for the mattress core 16, for instance by having optional up-pointing structures (not shown) engaging sides of the mattress core 16.

As best seen in FIG. 1a-1b, the padding layer 18 is arranged between the mattress core 16 and the cover 20, which cover 20 in turn is arranged over the bed 10 so as to provide covering and cover the top of the mattress core 16 (and the padding layer 18), as well as at least a portion of the front side of the mattress core 16. The padding layer 18 has a fixed width (i.e. extension in the direction w) substantially corresponding to that of the mattress core 16 and base 14 when in their expanded states as illustrated in FIG. 1a. The padding layer 18 may for instance be made of polyether with a thickness of about 20 mm, and is preferably attached to the cover 20 by e.g. gluing along the interface therebetween.

The cover 20 is further attached on one hand to the front edge of the mattress core 16 at 46, and on the other hand to a retracting roll 56, which retracting roll 56 preferably is arranged at the back edge 48 of the bed 10. The retracting roll 56 may for instance be fixed to the base 14 or to an external wall (not shown) to which the bed is mounted. Specifically, a portion 58 of the cover 20 next to the retracting roll 56 may be thinner than the rest of the cover, for facilitating roll-up on and roll-off from the retracting roll 56. The thicker main portion of the cover 20 is for instance made of some textile, while the thinner portion 58 is made of non-woven material, for example. The retracting roll 56 is biased aiming to turn in the clockwise direction as seen in FIGS. 1a-1b, and will release more cover 20 when the cover 20 is urged to the left in FIGS. 1a-1b with a force larger than a retracting force of the roll 50, for instance when the bed 10 is actuated from a contracted state to an expanded state by a user, and keep the cover 20 tensioned by rolling up more of it when for instance when the bed 10 is actuated from an expanded to a contracted state. At the same time, the underlying padding layer 18 attached to the cover 20 follows along as the state of the bed 10 is changed. Preferably, the length $L_{58}$ of the portion 58 of thinner material between the rest of the cover and the retracting roll 56, and/or the position of the retracting roll 56, is/are selected such that only thinner material 58 is rolled up on the retracting roll 56 in the contracted state, while only thicker cover material covers the top of the mattress core 16 in the expanded state.

In order to facilitate the retraction of the cover 20 and padding layer 18 by means of the retracting roll 56, a piece of material 52 is preferably arranged between the mattress core 16 and the padding layer 18. The piece of material 52 can for instance be made of non-woven material like polypropylene and have a thickness of about 0.4 mm. The piece of material basically extends over the entire top area of the mattress core 16. At the front edge 46, the piece of material 52 is attached to the top of the mattress core 16, while at the back edge 48, the piece of material 52 is attached to a retracting roll 50. The piece of material 52 is in this embodiment not attached to the padding layer 18. The retracting roll 50 for the piece of material 58 functions similar to the retracting roll 56 for the padding layer 18 and cover 20, and hence retracts (roll up) or releases (roll off) a suitable amount of the piece of material 52 depending on the state of the bed 10.

The retracting roll 50 may for instance be positioned as illustrated in FIGS. 1a-1b, that is, at the upper side of the back edge 48, while the retracting roll 56 is positioned at the lower side of the back edge 48, over the retracting roll 50, so that the cover 20 may fold over and also cover the retracting roll 50.

Instead of being attached to the cover 20, the padding layer 18 may instead be attached to the piece of material 52, and is then managed by the retracting roll 50.

Overall, a user may alter the extension, that is, the width W, of the present bed 10 by moving the edges 46 and 48 closer together or further apart, conveniently by operating the base 14. As this is effected, the rest of the bed (that is, the mattress core 16, the padding layer 18, and the cover 20) follows along automatically, and their extensions are adjusted by essentially the same amount. With respect to the mattress core 16, the separation distances SD between the springs 34 are changed, while more or less padding layer 18 or cover 20 is accommodated on the retracting roll 50, in order to match the size of the rest of the bed. As the only inter-attachment points are essentially along the edges 46 and 48, the base 14, mattress core 16, and cover 20 together with the padding layer 18 may evolve relatively independently between these edges, providing for smooth change of the bed's width.

Figure 5A:
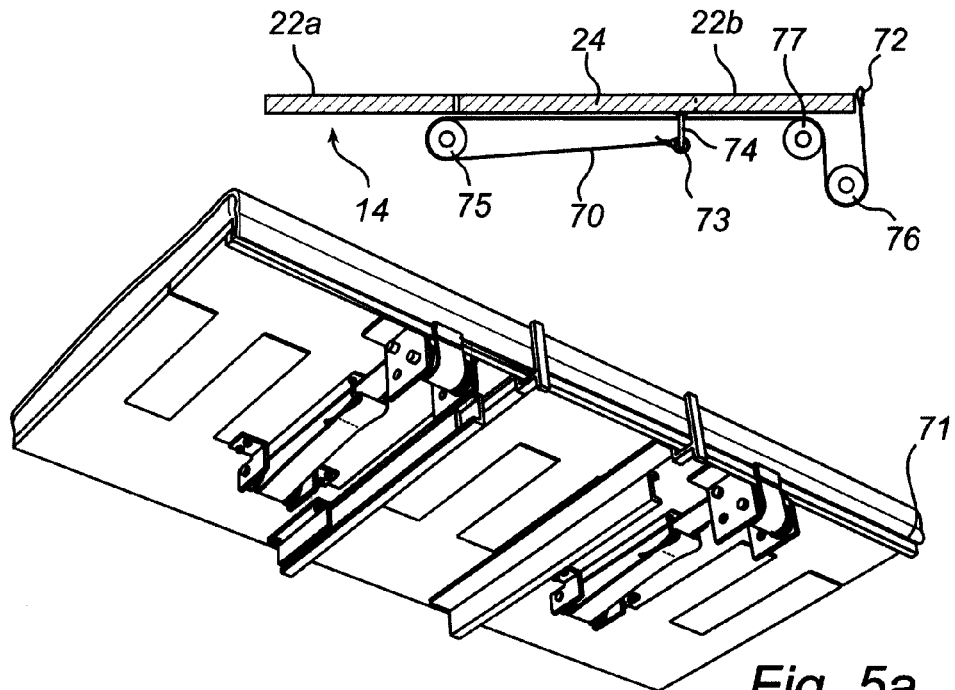
FIGS. 5a and 5b are schematic perspective views seen from below of the variable-size bed according to another embodiment, showing the bed in an contracted state and a expanded state, respectively. Corresponding partial sectional views are also illustrated.
Figure 5B:
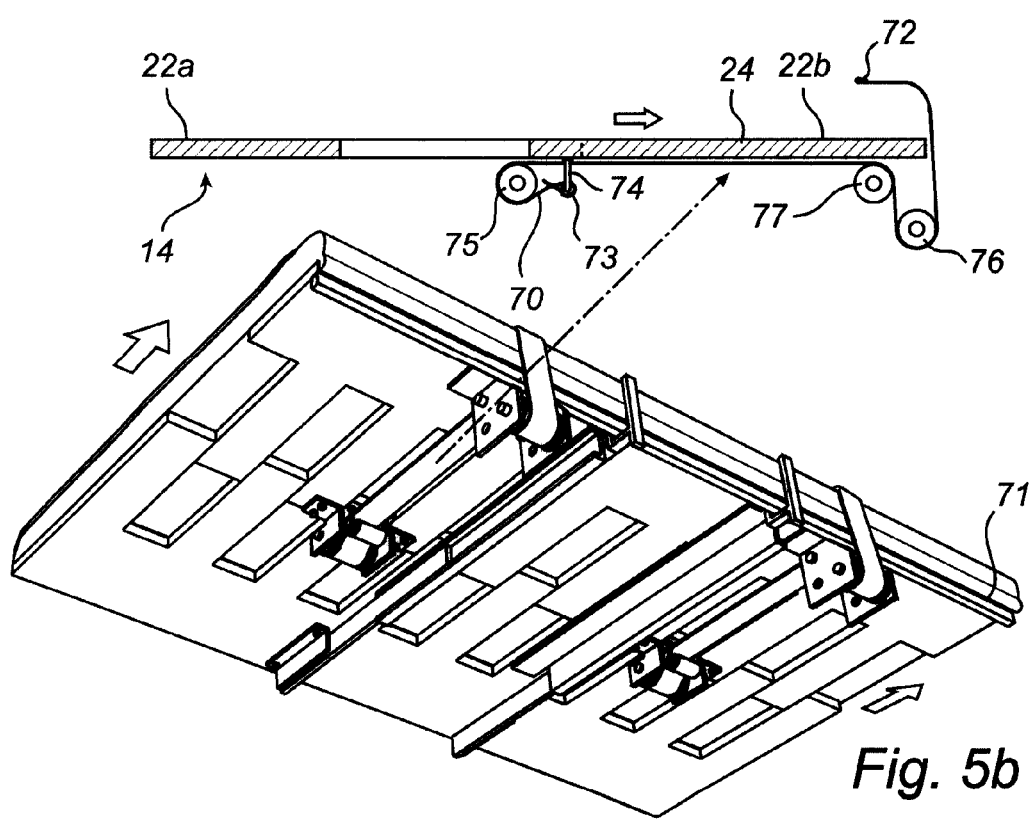

A cover means according to an alternative embodiment is illustrated in FIGS. 5a and 5b. It is to be understood that except the features of this embodiment explicitly discussed in the following, the variable-size bed of this embodiment may have the same or similar features as in the previously discussed embodiments.

The cover means of this embodiment comprises a cover attached to a retracting element. As in the above-discussed embodiments, the retracting element is arranged to release the cover during a change into the expanded state of the bed and to retract the cover during a change into the contracted state of the bed.

In the embodiment of FIGS. 5a and 5b, the retracting element is a non-elastic element 70 connecting the base 14 of the bed to an edge of the cover extending perpendicular to the adjustability direction of the bed. The edge of the cover is preferably provided with a rigid rim 71, e.g. in the form of a sewn-in list or bar, extending over the length of the edge, in order to distribute the tension evenly over the cover. The non-elastic element 70 is arranged to constantly maintain the cover in a tense, or at least relatively tense, state. In the shown embodiment the non-elastic element 70 is in the form of a connection line, such as a strap, wire, cord, belt or the like. Further, the above-discussed base 14 with two displaceable part 22a, 22b is used. The connection line 70 is connected with one end 72 to the rigid rim 71 of the cover. With the other end 73 the connection line is connected to the base part 22a being farthest away from the connection to the cover, by means of a connection element 74, such as a U-bolt or yoke. The connection line 70 is further drawn via a holding element 75, such as a tackle, roll or ring, arranged to slidably hold the connection line, and connected to the base part 22b being closest to the connection to the cover. Further, the connection element 74 is arranged closer to the connection to the cover than the holding element 75. This may be achieved by arranging the holding element 75 and the connection element 74 on the tongues 24 of the interleavable comb-shaped parts 22a, 22b. In order to provide low friction for the connection line, one or more additional rolls 76, 77 may also be provided.

By means of the arrangement of this embodiment, the cover will automatically be released or retracted in proportion to the displacement between the base parts. FIG. 5a illustrates the bed in a contracted state, whereas FIG. 5b illustrates the bed in an expanded state.

Preferably, two non-elastic elements of this type are arranged at separate positions, in order to provide a evenly distributed tensioning over the cover. However, more than two elements are also feasible. Further, it is also feasible to use only one non-elastic element. In this case, connection line may e.g. be Y-shaped, with two separated connections to the cover, and one connection to the base.

A similar cover means as discussed above with reference to FIGS. 5a and 5b is also useable in combination with other base arrangements. Such an alternative base construction will be discussed in the following, with reference to FIGS. 6a-6d. It is to be understood that except the base construction of this embodiment explicitly discussed in the following, the variable-size bed of this embodiment may have the same or similar features as in the previously discussed embodiments.

In the embodiment of FIGS. 6a-6d, the base comprises two parts 80, 82, arranged in an overlapping and displaceable configuration, so that the extent of the overlap is variable between a narrow overlap when the base is in the extended state, and a broad overlap when the base is in the compressed state. More specifically, the illustrated embodiment comprises a first part 80 with a tongue 81 being thinner than the rest of the part, wherein the tongue 81 is displaceably insertable between the mattress core and the second part 82.

The cover means of this embodiment is similar to the one discussed above with reference to FIG. 5, and comprises a cover attached to a non-elastic retracting element 70' connecting the base of the bed to an edge of the cover extending perpendicular to the adjustability direction of the bed. The edge of the cover is preferably provided with a rigid rim 71' extending over the length of the edge. The non-elastic element 70' is arranged to constantly maintain the cover in a tense, or at least relatively tense, state. In the shown embodiment the non-elastic element 70' is in the form of a connection line, such as a strap, wire, cord, belt or the like. The connection line 70' is connected with one end to the rigid rim 71' of the cover. With the other end 73' the connection line is connected to the base part 81 being farthest away from the connection to the cover, by means of a connection element 74', such as a screw, adhesive or the like. The connection line 70' is further drawn via a holding element 75', such as a tackle, roll or ring, arranged to slidably hold the connection line, and connected to the base part 82 being closest to the connection to the cover. Further, the connection element 74' is arranged closer to the connection to the cover than the holding element 75'. This is in this embodiment achieved by the provision of a cut-out portion 83 of the part 82. In order to provide low friction for the connection line, one or more additional rolls 76' may also be provided (in the illustrated example only one).

Figure 6A:
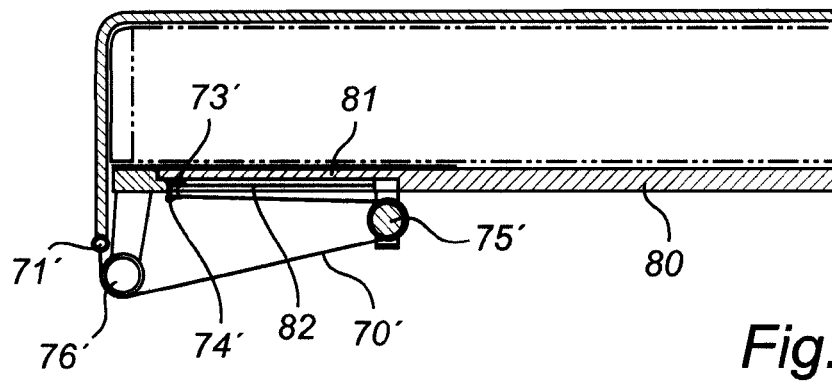
FIGS. 6a-6d are schematic perspective views seen from below of the variable-size bed according to still another embodiment, showing the bed in an contracted state and a expanded state, respectively. Corresponding partial sectional views are also illustrated.
Figure 6B:
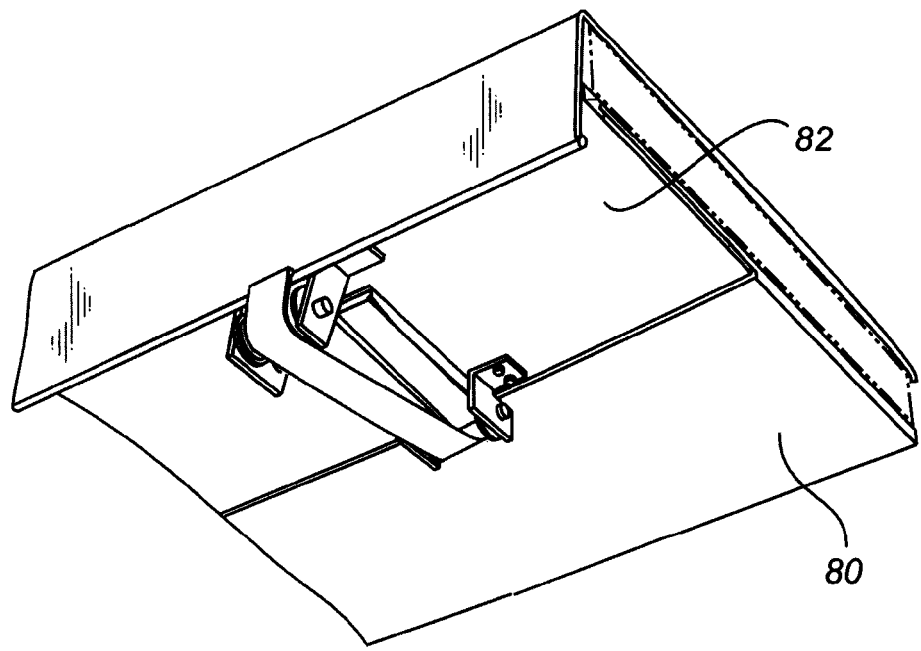
Figure 6C:
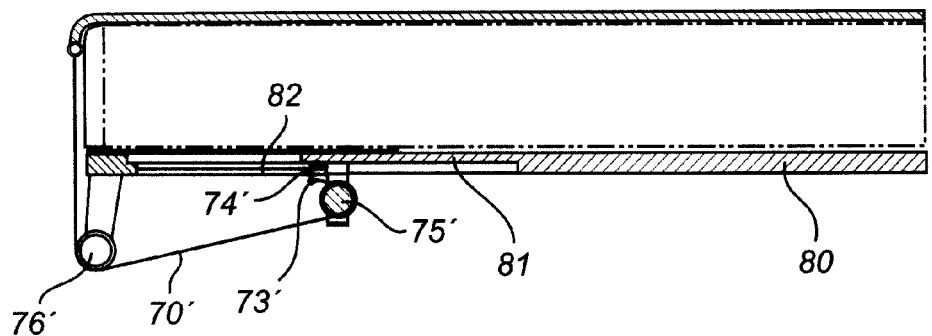
Figure 6D:
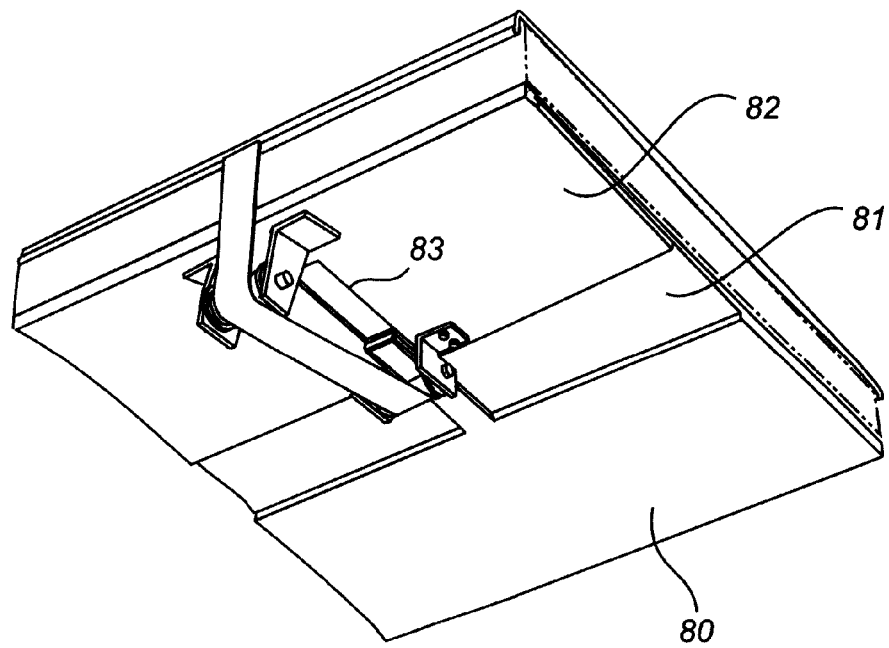

By means of the arrangement of this embodiment, the cover will automatically be released or retracted in proportion to the displacement between the base parts. FIGS. 6a and 6b illustrate the bed in a contracted state, whereas FIGS. 6c and 6d illustrate the bed in an expanded state.

Preferably, two non-elastic elements of this type are arranged at separate positions, in order to provide a evenly distributed tensioning over the cover. However, more than two elements are also feasible. Further, it is also feasible to use only one non-elastic element. In this case, connection line may e.g. be Y-shaped, with two separated connections to the cover, and one connection to the base.

In FIGS. 6a and 6b, only part of the bed is illustrated, in order to simplify the disclosure. However, the bed structure illustrated in FIG. 6 may naturally also comprise the various additional features discussed above in relation to the other embodiments. For example, the base parts may be connected by a guide structure comprising at least one pair of slidably engaged rails, locking means for fixing the base parts in various positions, etc.

FIGS. 7a-7c illustrate a truck cab 60 comprising a variable-size bed 10 according to the present invention. The variable-size bed 10 is advantageously of the type described in relation to FIGS. 1-6 above, having adjustable width.

The back side 48 of the bed 10 is mounted to a wall 62 of the cab 60, for instance a back wall. A user may change the width of the bed 10 by operating the switch 32 placed centrally on front of the bed 10, while at the same time pushing the front side 46 towards the wall 62 for making it narrower, or pulling it away from the wall 62 to make it wider. In a contracted state (FIG. 7a), the bed 10 may function at a seating arrangement, for instance a back seat, where the narrower width of the bed may allow for more leg room and use of a backrest 64 on the wall 62. On the other hand, in an expanded state (FIG. 7b), the bed 10 may function as a sleeping arrangement, where the wider width of the bed provides a more suitable lying area. Further, by using a mattress core structure as described in relation to FIGS. 3a-3b, for example, the comfort of the bed will automatically be adjusted depending on its state, that is, harder comfort in the contracted state, and softer comfort in the expanded state.

The bed 10 may optionally be hingedly mounted to the wall 62, so that it can be folded against the wall 62 when not in use to save space, as illustrated in FIG. 7c.

The person skilled in the art realizes that the present invention by no means is limited to the preferred embodiments described above. On the contrary, many modifications and variations are possible within the scope of the appended claims. For instance, instead of having adjustable width, the bed may have adjustable length L. Also, other mattress cores having extensible width or length could be used. Also, other bases having adjustable width or length could be used. Also, the bed may be used in other applications other than the illustrated truck cab, for instance in a sofa bed which is firmer when used as a sofa for sitting and softer when expanded to the bed state.

The invention claimed is:

1. A variable-size bed comprising:
   a mattress core; and
   a base configured to support at least a portion of the mattress core, wherein the mattress core and base have adjustable widths or lengths and each of the mattress core and base is changeable between an expanded state and a contracted state corresponding to an expanded state and a contracted state of the bed, respectively,
   wherein the bed further includes a cover configured to provide covering over the mattress core in both the expanded state and the contracted state of the bed,
   wherein the mattress core is a pocket-spring mattress core having a plurality of interconnected coil springs enclosed in spring covers, in which the pocket-spring mattress core includes at least two springs that are located adjacent to one another and are arranged side-by-side to be aligned along an axis extending in a direction in which the mattress core and base adjust in said widths or lengths between the expanded and contracted states,
   wherein each of the at least two springs includes a central axis, which are aligned substantially parallel to the axis extending in the direction that the mattress core expands and contracts, and
   wherein the at least two springs are spaced apart by an interadjacent separation distance when the mattress core is in the expanded state and are closer together when the mattress core is in the contracted state.

2. A bed according to claim 1, wherein the cover is attached to a retractor configured to release the cover during a change into the expanded state of the bed and to retract the cover during a change into the contracted state of the bed.

3. A bed according to claim 1, wherein the cover includes a portion coupled to a roller configured to automatically roll out the cover in the expanded state and roll in the cover in the contracted state.

4. A bed according to claim 1, wherein the cover is coupled to an elastic retractor.

5. A bed according to claim 1, wherein the cover is made of a stretchable material.

6. A bed according to claim 1, further comprising a padding layer arranged between the cover and the mattress core.

7. A bed according to claim 1, wherein the base comprises two parts displaceable in relation to each other in a width or length direction.

8. A bed according to claim 7, wherein said parts are two opposite interleavable comb-shaped parts.

9. A bed according to claim 7, further comprising a guide structure to which said parts are mounted.

10. A bed according claim 7, further comprising:
    a lock configured to interlock said parts in at least the expanded state and the contracted state of the base.

11. A bed according to claim 1, wherein:
    the width or length of at least one of the mattress core or base in the expanded state is about 15-50% greater than the width or length of at least one of the mattress core or base in the contracted state.

12. A bed according to claim 1, wherein the mattress core and the base are only attached at two opposite sides of the bed, said sides being transverse to the adjustable widths or lengths direction, whereby the base and mattress core may expand/contract independently therebetween.

13. A vehicle comprising a size-adjustable bed according to claim 1.

14. A bed according to claim 1, wherein the mattress core includes a plurality of interconnected coil springs enclosed in respective spring covers and arranged in rows located side-by-side.

15. A bed according to claim 1, wherein the cover is configured to cover an entire upper surface of the mattress core in both the expanded and contracted states.

16. A bed according to claim 1, wherein the mattress core is expanded symmetrically to provide an even distribution of the extension between the springs, so that a density of the springs both in a length and width directions in the mattress core is essentially uniform at all positions over the mattress core both in the contracted and the expanded states.

17. A variable-size bed, comprising:
a mattress core;
a base to support the mattress core, the base and mattress core configured to adjust in width or length between expanded and contracted states corresponding to respective expanded and contracted states of the bed;
a cover configured to cover the mattress core in both the expanded and contracted states of the bed; and
a retractor configured to release the cover when the bed changes from the contracted state to the expanded state and to retract the cover when the bed changes from the expanded state to the contracted state, wherein:
the mattress core includes adjacent coil springs spaced by a distance when the mattress core is in the expanded state and closer together when the mattress core is in the contracted state, and
the retractor includes a non-elastic material coupling an edge of the cover to the base of the bed, said non-elastic material being arranged to maintain the cover in a substantially tense state.

18. A variable-size bed, comprising:
a mattress core;
a base configured to support at least a portion of the mattress core, the based and mattress core configured to adjust in width or length between expanded and contracted states corresponding to respective expanded and contracted states of the bed, respectively,
a cover configured to cover the mattress core in both the expanded and contracted states of the bed; and
a first roller configured to automatically roll out the cover in the expanded state and roll in the cover in the contracted state, wherein:
the mattress core includes adjacent springs spaced by a distance when the mattress core is in the expanded state and closer together when the mattress core is in the contracted state, and
a first portion of the cover coupled to the first roller is thinner than a second portion of the cover.

19. A bed according to claim 18, further comprising:
a padding layer between the cover and mattress core, and
a piece of material arranged between the padding layer and the mattress core and coupled to a second automatic roller.

20. A bed according to claims 19, wherein:
the cover and padding layer are attached to a front edge of the bed, the second automatic roller is arranged at a back edge of the bed opposite said front edge, and
the first automatic roller is arranged at the back edge of the bed such that the cover also covers said the second automatic roller.

21. An apparatus to provide support, comprising:
a base; and
a core coupled to the base and including a plurality of springs,
wherein a size of the base and core change in a first direction between contracted and expanded states,
wherein at least two springs of the plurality of springs are located adjacent to one another and aligned along an axis extending in the first direction and are separated by a first distance in the contracted state and are separated by a second distance greater than the first distance in the expanded state, and
wherein each of the at least two springs includes a central axis, which are aligned substantially parallel to the axis extending in the direction that the mattress core expands and contracts.

22. The apparatus of claim 21, wherein:
the core has a first compression level when the two springs are separated by the first distance in the contracted state,
the core has a second compression level less than the first compression level when the two springs are separated by the second distance in the expanded state.

23. The apparatus of claim 21, wherein the size of the base and core are substantially equal in at least one of the contracted state or the expanded state.

* * * * *